US012407139B2

(12) United States Patent
Liu et al.

(10) Patent No.: US 12,407,139 B2
(45) Date of Patent: *Sep. 2, 2025

(54) INTEGRALLY SHIELDED CABLE CONNECTOR

(71) Applicant: Amphenol Commercial Products (Chengdu) Co., Ltd., Chengdu (CN)

(72) Inventors: Yunxiang Liu, Chengdu (CN); Jianke Zeng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,487

(22) Filed: Jun. 24, 2024

(65) Prior Publication Data

US 2024/0347983 A1 Oct. 17, 2024

Related U.S. Application Data

(63) Continuation of application No. 17/505,437, filed on Oct. 19, 2021, now Pat. No. 12,057,663.

(30) Foreign Application Priority Data

Oct. 22, 2020 (CN) ......................... 202011136063.1
Oct. 22, 2020 (CN) ......................... 202022373960.6
(Continued)

(51) Int. Cl.
*H01R 13/6597* (2011.01)
*H01R 13/42* (2006.01)
(Continued)

(52) U.S. Cl.
CPC ......... *H01R 13/6597* (2013.01); *H01R 13/42* (2013.01); *H01R 13/6585* (2013.01); *H01R 13/6592* (2013.01)

(58) Field of Classification Search
CPC ................ H01R 13/6597; H01R 13/42; H01R 13/6585; H01R 13/6592; H01R 12/75; H01R 12/714
See application file for complete search history.

(56) References Cited

U.S. PATENT DOCUMENTS 6,641,429 B1 * 11/2003 Wu .................... H01R 13/5812 439/465
8,684,752 B2 4/2014 Hsueh
(Continued)

FOREIGN PATENT DOCUMENTS

CN 210866602 U 6/2020
CN 111555069 A 8/2020
(Continued)

OTHER PUBLICATIONS

International Search Report and Written Opinion mailed Jan. 26, 2022 for International Application No. PCT/CN2021/125254.
(Continued)

*Primary Examiner* — Travis S Chambers
(74) *Attorney, Agent, or Firm* — Wolf, Greenfield & Sacks, P.C.

(57) ABSTRACT

A cable assembly with a shielded termination portion where signal conductors of a plurality of cables are directly mounted to tail portions of signal terminals of a cable connector. Shielding in the termination portion may be provided by interaction of a wave-shaped shield, tail portions of ground terminals between tail portions of the signal terminals, a cross bar connecting the ground terminals and an exposed portion of a cable shield. The wave-shaped shield may be mechanically connected to at least the tail portions of the ground terminals and may be configured to press the cable shields into the bar. Such a configuration improves signal transmission performance by providing a consistent shielding at the connection areas where the cables
(Continued)

are mounted to the tail portions of the conductive terminals and at the same time eliminates the need of an intermediate circuit board and therefore reduces manufacturing costs.

19 Claims, 8 Drawing Sheets

(30) Foreign Application Priority Data

Apr. 16, 2021 (CN) ........................ 202110412091.X
Apr. 16, 2021 (CN) ........................ 202120784796.X

(51) Int. Cl.
*H01R 13/6585* (2011.01)
*H01R 13/6592* (2011.01)

(56) References Cited

U.S. PATENT DOCUMENTS

| | | | |
|---|---|---|---|
| 10,381,767 | B1 | 8/2019 | Milbrand, Jr. et al. |
| 10,680,364 | B2 | 6/2020 | Champion et al. |
| 11,381,038 | B1 | 7/2022 | Patel |
| 11,469,553 | B2 | 10/2022 | Johnescu et al. |
| 11,469,554 | B2 | 10/2022 | Ellison et al. |
| 11,670,879 | B2 | 6/2023 | Zerebilov |
| 12,057,663 | B2 * | 8/2024 | Liu ...................... H01R 13/424 |
| 2015/0207274 | A1 | 7/2015 | Wu et al. |
| 2021/0234291 | A1 * | 7/2021 | Zerebilov .............. H01R 12/75 |
| 2021/0234314 | A1 | 7/2021 | Johnescu et al. |
| 2021/0234315 | A1 | 7/2021 | Ellison et al. |
| 2022/0173550 | A1 | 6/2022 | Liu et al. |
| 2022/0216653 | A1 | 7/2022 | Little |
| 2022/0407269 | A1 | 12/2022 | Ellison et al. |
| 2023/0062661 | A1 | 3/2023 | Johnescu et al. |
| 2023/0396005 | A1 | 12/2023 | Liu et al. |

FOREIGN PATENT DOCUMENTS

| | | | |
|---|---|---|---|
| CN | 111564723 | A | 8/2020 |
| CN | 211456069 | U | 9/2020 |
| CN | 111769395 | A | 10/2020 |
| CN | 111769396 | A | 10/2020 |
| CN | 112072401 | A | 12/2020 |
| CN | 112086775 | A | 12/2020 |
| CN | 212412345 | U | 1/2021 |
| CN | 213124740 | U | 5/2021 |
| CN | 213151165 | U | 5/2021 |
| CN | 112993659 | A | 6/2021 |
| CN | 113422243 | A | 9/2021 |
| CN | 215184602 | U | 12/2021 |
| JP | 2004-039635 | A | 2/2004 |
| TW | M388773 | U | 9/2010 |
| TW | M458009 | U | 7/2013 |
| TW | 1475754 | B | 3/2015 |
| TW | M590802 | U | 2/2020 |
| TW | D209874 | S | 2/2021 |
| TW | 202131555 | A | 8/2021 |
| WO | WO 2019/000183 | A1 | 1/2019 |
| WO | WO 2022/084750 | A1 | 4/2022 |

OTHER PUBLICATIONS

No Author Listed, Specification for Quad Small Form Factor Pluggable Module 112. QSFP112 Published Specification Rev 2.0. QSFP112 Multi-Source Agreement. Jan. 2, 20222. 55 pages.

Taiwanese Office Action dated Apr. 18, 2025 in connection with Taiwanese Application No. 110139057.

* cited by examiner

INTEGRALLY SHIELDED CABLE CONNECTOR

RELATED APPLICATIONS

This application is a continuation of U.S. patent application Ser. No. 17/505,437, now U.S. Pat. No. 12,057,663, filed on Oct. 19, 2021, entitled "INTEGRALLY SHIELDED CABLE CONNECTOR," which claims priority to and the benefit of Chinese Patent Application Serial No. 202120784796.X, filed on Apr. 16, 2021. U.S. patent application Ser. No. 17/505,437, now U.S. Pat. No. 12,057,663, also claims priority to and the benefit of Chinese Patent Application Serial No. 202110412091.X, filed on Apr. 16, 2021. U.S. patent application Ser. No. 17/505,437, now U.S. Pat. No. 12,057,663, also claims priority to and the benefit of Chinese Patent Application Serial No. 202022373960.6, filed on Oct. 22, 2020. U.S. patent application Ser. No. 17/505,437, now U.S. Pat. No. 12,057,663, also claims priority to and the benefit of Chinese Patent Application Serial No. 202011136063.1, filed on Oct. 22, 2020. The contents of these applications are incorporated herein by reference in their entirety.

FIELD

This application relates generally to electrical interconnection systems, such as those including cables, used to interconnect electronic components.

BACKGROUND

Cables may be used to interconnect electronic components that are separated by a distance. As electronic systems become increasingly more complex, an electrical connector may be used to establish the electrical connections between a plurality of cables and a circuit board on which some of the electronic components to be interconnected are mounted.

BRIEF SUMMARY

Aspects of the present disclosure relate to integrally shielded cable connectors.

Some embodiments relate to a cable connector. The cable connector may include an insulative housing; a plurality of conductive terminals held in a row by the insulative housing, the plurality of conductive terminals comprising pairs of signal terminals separated by ground terminals, each conductive terminal comprising a contact portion, a tail portion opposite the contact portion, and an intermediate portion extending between the contact portion and the tail portion; and a shield mechanism. The shield mechanism may include the ground terminals, a crossbar connecting the tail portions of the ground terminals, and a wave-shaped shield member comprising alternating peak portions and valley portions, wherein each valley portion is mounted to a respective ground terminal, and each peak portion spans a respective pair of signal terminals.

In some embodiments, for each pair of signal terminals, the tail portions of the pair of signal terminals may be disposed in a U-shaped space defined by the crossbar and the tail portions of two adjacent ground terminals.

In some embodiments, each peak portion of the wave-shaped shield member may include an opening sized and positioned to expose at least a portion of the tail portions of a respective pair of signal terminals.

In some embodiments, each valley portion of the wave-shaped shield member may be welded to a respective ground terminal.

In some embodiments, the insulative housing may include a socket configured to receive at least a portion of a circuit board.

In some embodiments, the contact portions of the conductive terminals may curve into the socket of the insulative housing.

Some embodiments relate to a cable assembly. The cable assembly may include a cable connector and a plurality of cables. The cable connector may include a plurality of conductive terminals held in a row, the plurality of conductive terminals comprising pairs of signal terminals separated by ground terminals, each conductive terminal comprising a contact portion, a tail portion opposite the contact portion, and an intermediate portion extending between the contact portion and the tail portion; and a shield mechanism comprising the ground terminals and a crossbar connecting the tail portions of the ground terminals. Each cable of the plurality of cables may include a pair of signal conductors and a shield conductor surrounding the pair of signal conductors. The pair of signal conductors of each cable may be mounted on the tail portions of a respective pair of signal terminals, and the shield conductor of each cable may be electrically connected to the ground terminals through contacting the crossbar.

In some embodiments, the shield mechanism may include a wave-shaped shield member. The wave-shaped shield member, the ground terminals, the crossbar and the shield conductor together may form shielding around connection areas where the signal conductors of the cables are mounted on the tail portions of the signal terminals.

In some embodiments, the wave-shaped shield may include peak portions and valley portions disposed in alternative. Each valley portion may be attached to a respective ground terminal. Each peak portion may span a respective pair of signal terminals and define a chamber in which a respective pair of signal conductors of a cable may be received. Each peak portion may press against a respective shield conductor of a cable so as to urge the cable towards the crossbar.

In some embodiments, each peak portion may include an opening into the chamber such that at least a portion of a respective connection area may be visible through the opening.

In some embodiments, each peak portion may include a first holding mechanism for increasing retention of the respective shield conductor of the cable.

In some embodiments, the first holding mechanism may include a protrusion or barb protruding from the wave-shaped shield into the chamber.

In some embodiments, the crossbar may include a second holding mechanism for increasing retention of the respective shield conductor of the cable.

In some embodiments, the second holding mechanism may include a protrusion or barb protruding from the crossbar into the chamber.

In some embodiments, the tail portions of the ground terminals, the tail portions of the plurality of pairs of signal terminals and the crossbar may be substantially in a same plane.

Some embodiments relate to a cable connector. The cable connector may include a plurality of conductive terminals, each conductive terminal comprising a contact portion, a tail portion opposite the contact portion, and an intermediate portion extending between the contact portion and the tail portion; a terminal retention mechanism holding the plurality of conductive terminals in two opposed rows, the conductive terminals in each row are aligned therein and comprise pairs of signal terminals separated by ground terminals, the tail portions of the plurality of ground terminals extending beyond the tail portions of the plurality of pairs of signal terminals; and a shield mechanism comprising the ground terminals, a crossbar connecting the tail portions of the ground terminals, a first wave-shaped shield member electrically and mechanically attached to the ground terminals of a first row of conductive terminals, a second wave-shaped shield member mounted to the ground terminals of a second row of conductive terminals.

In some embodiments, the cable connector further comprising a third shield member extending between the two rows of conductive terminals in a plane parallel to the two rows of conductive terminals. The third shield member may be electrically connected to the first and second wave-shaped shield members.

In some embodiments, the cable connector further comprising a third shield member extending between the two rows of conductive terminals in a plane parallel to the two rows of conductive terminals. The third shield member may be electrically insulated from the first and second wave-shaped shield members.

In some embodiments, the third shield member may be embedded in the terminal retention mechanism.

In some embodiments, the terminal retention mechanism may include a retention portion extending vertically and a boss portion extending laterally from the retention portion.

The retention portion may be disposed around the plurality of conductive terminals to retain the plurality of conductive terminals in the two terminal rows, with tail portions of the conductive terminals in each row extending from the retention portion and resting on a corresponding side of the boss portion.

Some embodiments relate to a cable connector for providing an electrical connection between a circuit board and a cable. The cable connector may include an insulative housing; a plurality of conductive terminals held in the insulative housing, each conductive terminal comprising a contact portion configured for electrically connecting with a conductive portion of the circuit board and a tail portion configured for electrically connecting with an end portion of the cable; an insulative terminal retention mechanism disposed in the insulative housing and holding the plurality of conductive terminals; and a shield mechanism disposed in the insulative housing and configured for holding the end portion in position relative to the tail portion and providing shielding for a connection area where the tail portion is connected with the end portion when the tail portion is electrically connected with the end portion.

In some embodiments, the plurality of conductive terminals may include a signal terminal and ground terminals. The tail portions of the ground terminals may be connected together through a crossbar. The shield mechanism may include a first shield member. The cable may include a signal conductor and a shield conductor surrounding the signal conductor. The cable may be exposed at the end portion in such a manner that the signal conductor extends beyond the shield conductor. The signal conductor may be connected to the tail portion of the signal terminal. The first shield member may be mounted across the signal conductor and the signal terminal onto and in contact with the ground terminals and hold the shield conductor on the crossbar such that the shield conductor is in contact with the crossbar, whereby the first shield member, the ground terminals, the crossbar and the shield conductor together form a shield around a connection area where the signal conductor is connected with the signal terminal.

In some embodiments, the terminal retention mechanism may be configured for retaining the plurality of conductive terminals in two terminal rows mutually opposed and spaced apart. The conductive terminals in each terminal row may be aligned therein and comprise a plurality of pairs of signal terminals and a plurality of ground terminals. The tail portions of the plurality of ground terminals may extend beyond the tail portions of the plurality of pairs of signal terminals and may be connected together through the crossbar. A pair of signal terminals may be arranged between two adjacent ground terminals, with the tail portions of the pair of signal terminals disposed in a U-shaped space defined by the tail portions of the two adjacent ground terminals and the crossbar.

In some embodiments, the cable may include a plurality of cables, each cable comprising a pair of signal conductors and a shield conductor surrounding the pair of signal conductors. The cable may be exposed at the end portion in such a manner that the pair of signal conductors extend beyond the shield conductor. Each signal conductor of the pair of signal conductors may be connected to the tail portion of a corresponding signal terminal of a corresponding pair of signal terminals of the plurality of pairs of signal terminals, and the first shield member may hold the shield conductor on the crossbar such that the shield conductor is in contact with the crossbar.

In some embodiments, the first shield member may be in the form of a pair of first shield plates each mounted from outside of the two terminal rows onto and in contact with a plurality of ground terminals in a corresponding terminal row, extending longitudinally at least along the entire length of the corresponding terminal row and laterally at least along the tail portions of the plurality of ground terminals and the crossbar, and pressing against and being in contact with the shield conductor.

In some embodiments, each of the pair of first shield plates may be a wave-shaped plate having a peak portion and a valley portion. Each valley portion may be mounted onto and in contact with a corresponding ground terminal of the plurality of ground terminals.

Each peak portion may span the signal conductor and the signal terminal and define a chamber in which the end portion of the cable is received. The peak portion may press against and may be in contact with the shield conductor.

In some embodiments, each peak portion may be formed with an aperture open to the chamber to allow at least a connection area where the pair of signal conductors is connected to the tail portions of the corresponding pair of signal terminals to be accessible via the aperture.

In some embodiments, a first portion of each peak portion in contact with the shield conductor may be formed with a first holding mechanism for improving a holding force on the shield conductor.

In some embodiments, a second portion of the crossbar in contact with the shield conductor may be formed with a second holding mechanism for improving a holding force on the shield conductor.

In some embodiments, the first holding mechanism may include a protrusion or barb protruding from the first portion into the chamber.

In some embodiments, the second holding mechanism may include a protrusion or barb protruding from the second portion into the chamber.

In some embodiments, the tail portions of the plurality of ground terminals, the tail portions of the plurality of pairs of signal terminals and the crossbar may be substantially in the same plane.

In some embodiments, the shield mechanism may include a second shield member disposed between the two terminal rows in the terminal retention mechanism and extending longitudinally at least along the entire length of the two terminal rows and laterally at least along the tail portions of the plurality of ground terminals and the crossbar.

In some embodiments, the second shield member may be connected with the crossbar and/or the pair of first shield plates, or the second shield member is insulated from the crossbar and the pair of first shield plates.

In some embodiments, the second shield member may be in the form of a shield plate.

In some embodiments, the terminal retention mechanism may be of an elongated T-shaped body configuration and include a vertically extending retention portion and a boss portion extending laterally from the retention portion. The retention portion may be disposed around the plurality of conductive terminals to retain the plurality of conductive terminals in the two terminal rows, with tail portions of the conductive terminals in each terminal row extending from the retention portion and resting on a corresponding side of a first side and a second side opposite to the first side of the boss portion.

In some embodiments, the retention portion may include a first positioning protrusion protruding onto the first side and the second side. The first positioning protrusion may be configured for cooperating with the peak portion to enable the pair of first shield plates to be positioned accurately relative to the plurality of ground terminals and preventing the pair of first shield plates from moving in a direction along the first side and the second side relative to the plurality of ground terminals when the pair of first shield plates is mounted onto the plurality of ground terminals.

In some embodiments, the insulative housing may include a first housing portion and a second housing portion configured to be mounted to the first housing portion. The retention portion may be received in a terminal cavity defined by the first housing portion. The boss portion may project from the first housing portion and may be received in the second housing portion. The second housing portion may hold the pair of first shield plates in position when mounted to the first housing portion.

In some embodiments, the contact portions of the conductive terminals in each terminal row may extend cantilevered from the retention portion opposite to the tail portions and into the terminal cavity and together with the contact portions of the conductive terminals in the other terminal row define therebetween a receiving space for receiving the conductive portion of the circuit board. At least one socket may be formed in the first housing portion and open to the terminal cavity to allow for the insertion of the conductive portion of the circuit board into the receiving space between and in contact with the contact portions of the conductive terminals in the two terminal rows.

In some embodiments, the retention portion may include a first attachment structure and the first housing portion may include a second attachment structure. The first attachment structure and the second attachment structure may be configured for cooperating with each other to secure the retention portion in the terminal cavity.

In some embodiments, the first attachment structure may include a barb protruding from the retention portion and the second attachment structure may include a notch formed in the first housing portion for receiving the barb.

In some embodiments, the retention portion may include a first positioning structure and the first housing portion may include a second positioning structure. The first positioning structure and the second positioning structure may be configured for cooperating with each other to enable the retention portion to be accurately positioned in the terminal cavity when the retention portion is placed into the terminal cavity.

In some embodiments, the first positioning structure may include first positioning slots recessed into the retention portion from two longitudinally opposite end faces of the retention portion, respectively, and the second positioning structure may include first positioning ribs protruding into the terminal cavity from inner walls of the terminal cavity.

In some embodiments, the first housing portion may include a first mounting structure and the second housing portion may include a second mounting structure, the first mounting structure and the second mounting structure may be configured for cooperating with each other to secure the first housing portion and the second housing portion together.

In some embodiments, the first mounting structure may include two T-shaped protrusions mutually opposed formed across the terminal cavity on the first housing portion and the second mounting structure may include two T-shaped recesses recessed into the second housing portion from two longitudinally opposite end faces of the second housing portion. Each of the two T-shaped protrusions may snap into a corresponding one of the two T-shaped recesses.

In some embodiments, the boss portion may include a third positioning structure and the first housing portion may include a fourth positioning structure. The third positioning structure and the fourth positioning structure may be configured for cooperating with each other to enable the retention portion to be accurately positioned in the terminal cavity when the retention portion is placed into the terminal cavity.

In some embodiments, the third positioning structure may include a pair of third positioning ribs protruding from the boss portion from two longitudinally opposite end faces of the boss portion, respectively. The fourth positioning structure may include a second positioning rib formed on the two T-shaped protrusions. The second positioning rib may be received between the pair of third positioning ribs.

In some embodiments, the second housing portion may be mounted to the first housing portion by a dual injection molding.

In some embodiments, each valley portion may be mounted to a corresponding ground terminal of the plurality of ground terminals by laser welding.

Some embodiments relate to an electrical connection system. The electrical connection may include cables and the aforementioned cable connector. The cables may be connected to a plurality of conductive terminals of the cable connector.

These techniques may be used alone or in any suitable combination. The foregoing summary is provided by way of illustration and is not intended to be limiting.

BRIEF DESCRIPTION OF DRAWINGS

The following accompanying drawings of the present disclosure are used here as a part of the present disclosure for understanding the present disclosure. The accompanying drawings are not intended to be drawn to scale. For purposes of clarity, not every component may be labeled in every drawing. In drawings.

LIST OF REFERENCE NUMERALS

Figure 1A:
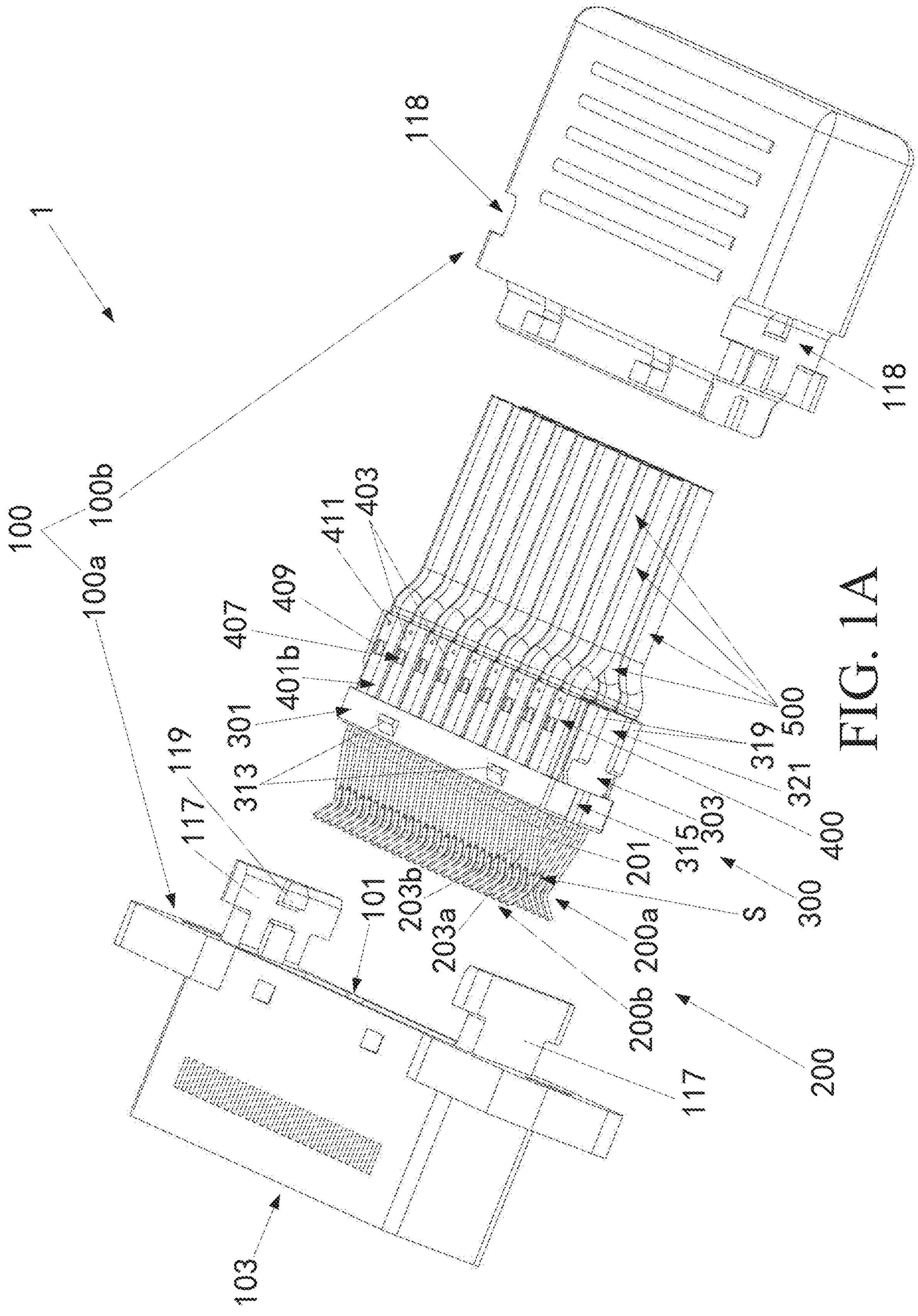
FIG. 1A is a partially exploded perspective view of a cable connector according to some embodiments.
Figure 1B:
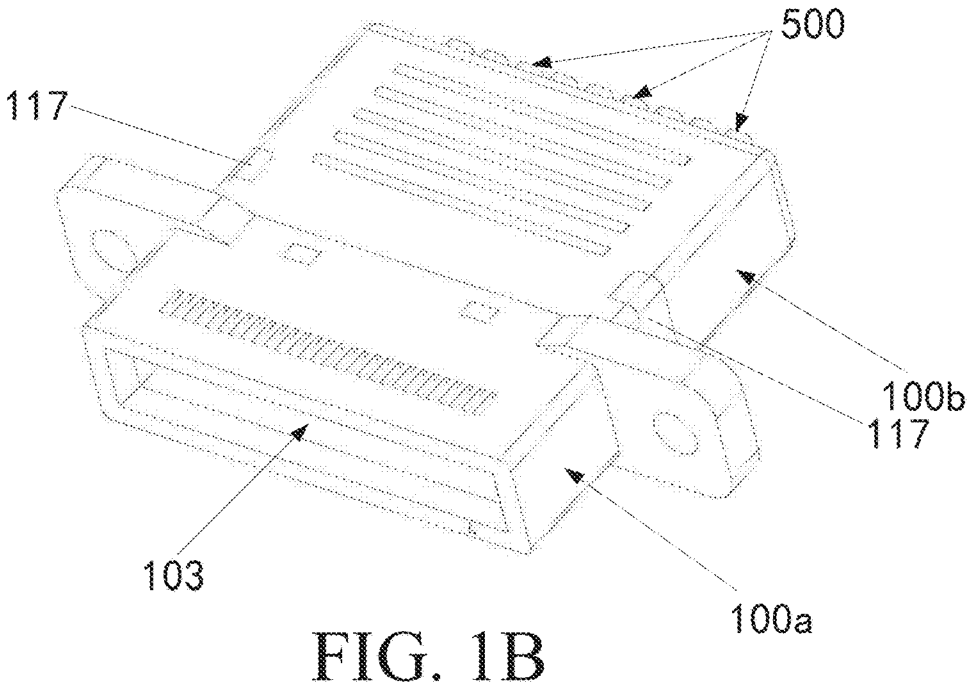
FIG. 1B is a perspective view of the cable connector of FIG. 1A in an assembled state.

1 cable connector
100 insulative housing
100*a* first housing portion
100*b* second housing portion
101 terminal cavity
103 first socket
113 second attachment structure
115 second positioning structure
117 first mounting structure
118 second mounting structure
119 fourth positioning structure
121*a*, 121*b* end faces
200 conductive terminals
200*a*, 200*b* terminal rows
201 ground terminal
203*a* first signal terminal
203*b* second signal terminal
205 contact portion
207 tail portion
209 body portion
211 crossbar
213 U-shaped space
300 terminal retention mechanism
301 retention portion
303 boss portion
305*a* first side
305*b* second side
307 first positioning protrusion
311 slot
313 first attachment structure
315 first positioning structure
316*a*, 316*b* end faces
319 third positioning structure
320*a*, 320*b* end faces
321 second positioning slot
400 shield mechanism
401 first shield member
401*a*, 401*b* a pair of first shield plates
403 peak portion
405 valley portion
407 chamber
409 aperture
411 first retention mechanism
413 second shield member
500 cable
501*a* first signal conductor
501*b* second signal conductor
503*a* first insulator
503*b* second insulator
505 shield conductor
507 external insulator
600 solder
S receiving space

DETAILED DESCRIPTION

The inventors have recognized and appreciated designs for cable connectors that may improve signal transmission performance and reduce manufacturing cost at the same time. The cable connector may be configured to support signal conductors of cables being directly mounted to tail portions of the signal terminals, which eliminates the need of an intermediate circuit board. The cable connector may also include an integrally formed shield mechanism, which provides consistent shielding at the connection areas where the cables are mounted to the tail portions of the conductive terminals and therefore improves signal transmission performance. The shield mechanism may also aid in terminating cables to the cable connector by facilitating mechanical connection of the cable to the terminals of the connector as well as forming electrical connections between cable shields and conductive terminals serving as grounds within the connector.

In some embodiments, the cable connectors may have terminals configured with contact portions configured to mate with a conductive pad in a mating structure. That mating structure may be, for example, a mating connector with blade-like terminals exposed in an insulative tongue, with the exposed portions of the terminals serving as a mating pad. In other embodiments, the pads may be pads along an edge of a printed circuit board containing electronic components to be connected to other parts of an electronic system through the cables terminated to the cable connector. In this configuration, a cable connector may be made without an intermediate circuit board as was used in conventional cable connectors to connect cables to conductive terminals of the connector. Cable connectors as described herein, in comparison to such conventional cable connectors, have lower manufacturing cost and avoid inconsistent shielding, which lead to poor signal transmission performance in conventional cable connectors especially, for example, at high frequency.

In some embodiments, the integrally formed shield mechanism may include a row of ground terminals connected by a crossbar at their tail portions. In some embodiments, the integrally formed shield mechanism may include one or more wave-shaped shield members that may each include alternating peak portions and valley portions. The valley portions may be mounted to respective ground terminals. The peak portions may span respective pairs of signal terminals separated by the ground terminals. The peak portions may press against the shield conductors of respective cables and press the shield conductors of the respective cables to the crossbar. The peak portions may include holding mechanisms for enhancing the forces applied to the shield conductors of the respective cables.

The peak portions may include openings sized and positioned to expose at least a portion of the tail portions of respective pairs of signal terminals such that, from the openings, any possible shorting between the pair of signal terminals caused by, for example, soldering the signal conductors of the cables to the signal terminals may be observed and resolved. In some embodiments, the integrally formed shield mechanism may include a shield member extending in a plane between two rows of conductive terminals. The shield member may be embedded in a portion of connector housing. In some embodiments, the shield member is electrically connected to the wave-shaped shield members. In some alternative embodiments, the shield member is not electrically connected to the wave-shaped shield members, even if mechanically connected.

Embodiments of a cable connector are described in detail below in conjunction with the accompanying drawings. It should be appreciated by the skilled person in the art that these embodiments are not meant to form any limitation on the present application.

FIGS. 1A to 1D illustrate a cable connector 1 according to an embodiment of the present application. As shown in FIGS. 1A to 1D, the cable connector 1 comprises an insulative housing 100, a plurality of conductive terminals (which may also be referred to as "conductive tabs") 200 held in the insulative housing 100, an insulative terminal retention mechanism (which may also be referred to as a "plastic retainer") 300 disposed in the insulative housing 100 and retaining the plurality of conductive terminals 200, and a shield mechanism 400 disposed in the insulative housing 100. Terminal retention mechanism 300 is an insulative body, which may be formed in one or more pieces, configured to hold the terminals.

In the illustrated embodiment, cable connector 1 is configured for providing an electrical connection between a mating structure, such as a circuit board (not shown), and a cable 500. The circuit board, for example, may be a paddle card in a mating connector or may be a daughter card in an electronic system. The circuit board may have an edge with a width fitting within socket 103 or may have a portion of an edge configured to fit within socket 103. Such a circuit board may be formed with a tab sized to fit within socket 103 extending from the edge and/or recesses perpendicular to the edge sized to receive walls of housing portion 100*a* bounding socket 103 such that portions of the board between the recesses may fit within socket 103. Regardless of the configuration of the circuit board, it may have pads against which contacts of the conductive terminals 200 may press to make a separable connection to the mating component.

Each conductive terminal 200 includes a tail portion configured for electrically connecting with an end portion of the cable 500 and a contact portion configured for electrically connecting with a conductive portion of a mating component, such as a pad on the circuit board, as will be described in detail below in conjunction with FIGS. 2A-2B, 3A-3B and 5. The shield mechanism 400 is configured for holding the end portion of the cable in position relative to the tail portions and providing shielding for a connection area where the tail portions are connected with the end portion when the tail portion is electrically connected with the end portion, as will be described in detail below in conjunction with FIGS. 1A and 6.

Figure 2A:
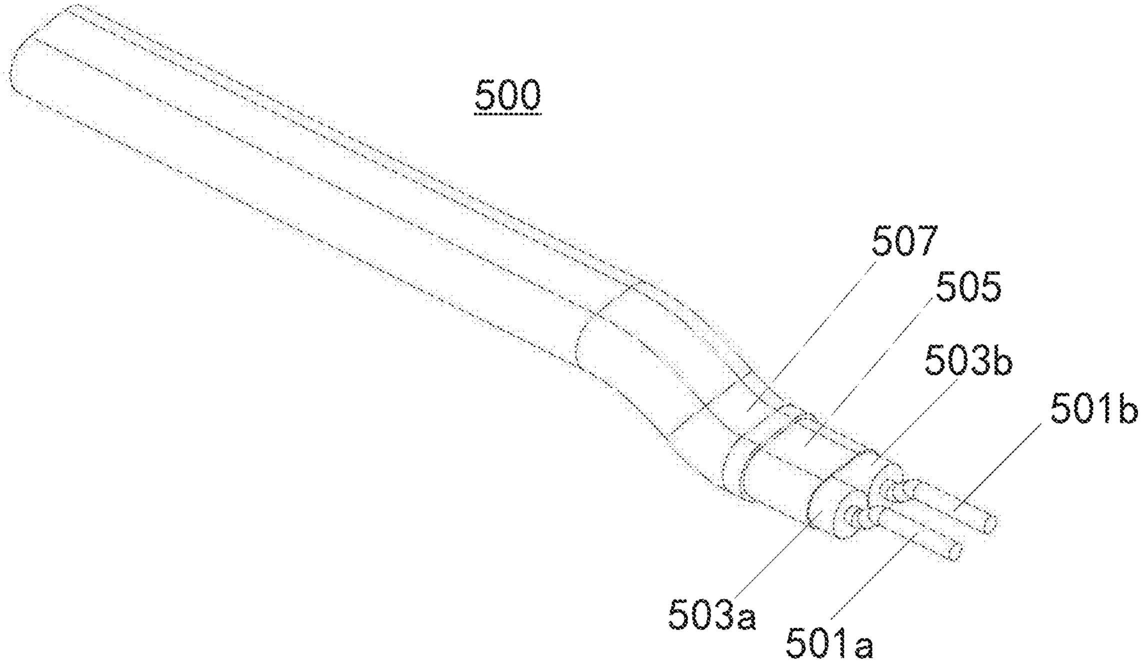
FIG. 2A is a perspective view of a cable of the cable connector of FIG. 1A.
Figure 2B:
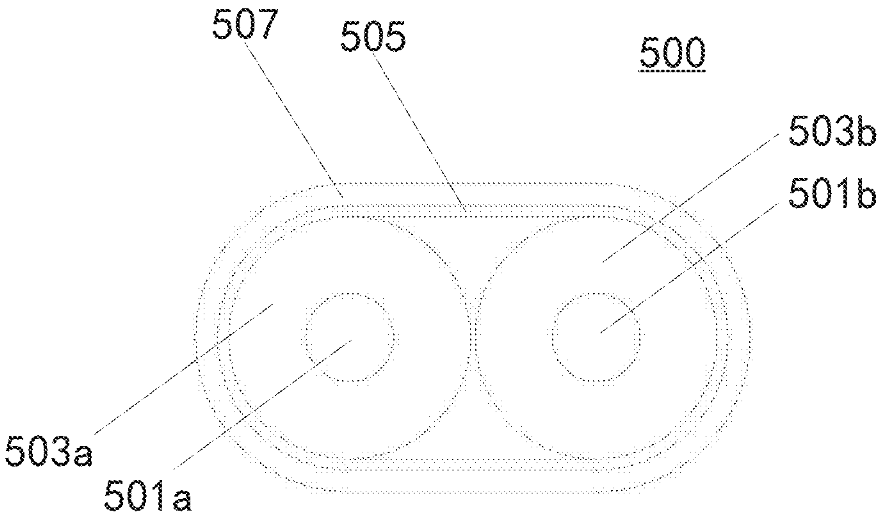
FIG. 2B is a cross-sectional view of the cable of FIG. 2A.

FIGS. 2A and 2B schematically illustrate a non-limiting example of the cable 500 suitable for connecting to a circuit board through the cable connector 1 shown in FIG. 1A. As shown in FIGS. 2A and 2B, each cable 500 includes one or more signal conductors and a shield conductor surrounding the signal conductors. In the illustrated embodiment, there are two signal conductors, forming a drainless, twinax cable. In order to establish an electrical connection with the conductive terminals 200 of the cable connector 1 or other electronic components, the cable 500 may be processed at the end portion in such a manner that the shield conductor is exposed, and the signal conductors extend beyond the shield conductor and insulative material surrounding the signal conductors within the bulk cable, as will be described in detail below.

Each cable 500 includes a central pair of signal conductors (which may also be referred to as "inner core wires") extending parallel to each other, hereinafter referred to as the first signal conductor 501*a* and the second signal conductor 501*b*. Each of the first signal conductor 501*a* and the second signal conductor 501*b* is formed from a conductive material. The conductive material suitable for forming the first signal conductor 501*a* and the second signal conductor 501*b* may be a metal (e.g., a copper) or a metal alloy (e.g., a copper alloy). The first signal conductor 501*a* and the second signal conductor 501*b* may be formed in any suitable gauge, such as 28 AWG, 30 AWG or 32 AWG. The first signal conductor 501*a* and the second signal conductor 501*b* may be used to transmit differential signals. For example, the first signal conductor 501*a* may be energized by a first voltage, and the second signal conductor 501*b* may be energized by a second voltage that cooperates with the first voltage. The voltage difference between the first signal conductor 501*a* and the second signal conductor 501*b* represents a signal.

Each of the first signal conductor 501*a* and the second signal conductor 501*b* is enclosed within a respective first insulator 503*a* and second insulator 503*b*. The first insulator 503*a* and the second insulator 503*b* may be bonded together, or separated from each other as shown. The first insulator 503*a* and the second insulator 503*b* run the entire length of the cable 500, except for the portion that are removed at the end portion of the cable 500 in order to establish an electrical connection with the cable connector 1. Each of the first insulator 503*a* and the second insulator 503*b* may be formed from an insulative material such as polypropylene (PP).

A shield conductor 505 is disposed around the first signal conductor 501*a*, the second signal conductor 501*b*, the first insulator 503*a* and the second insulator 503*b*. In other words, the first signal conductor 501*a*, the second signal conductor 501*b*, the first insulator 503*a* and the second insulator 503*b* are enclosed within the shield conductor 505. The shield conductor 505 may run the entire length of the cable 500, except for the portion that are removed at the end portion of the cable 500 in order to establish an electrical connection with the cable connector 1. That is, the shield conductor 505 may provide shielding for the first signal conductor 501*a* and the second signal conductor 501*b* over the entire length of the cable 500, except for the portion that is removed at the end portion of the cable 500 in order to establish an electrical connection with the cable connector 1. The shield conductor 505 may be formed of a conductive material, such as aluminized biaxially oriented PET film.

An outer insulator 507 is disposed around the first signal conductor 501*a*, the second signal conductor 501*b*, the first insulator 503*a*, the second insulator 503*b* and the shield conductor 505. In other words, the first signal conductor 501*a*, the second signal conductor 501*b*, the first insulator 503*a*, the second insulator 503*b* and the shield conductor 505 are enclosed within the outer insulator 507. The outer insulator 507 may run the entire length of the cable 500, except for the portion that are removed at the end portions of the cable 500 in order to establish an electrical connection with the cable connector 1. The outer insulator 507 may be referred to as the "sheath" of the cable 500. The outer insulator 507 may be formed of an insulative material, such as polyvinyl chloride (PVC).

It should be appreciated that the cable 500 is only exemplary and may be in any suitable form to provide the desired signal transmission performance. Although the first signal conductor 501*a* and the second signal conductor 501*b* are shown in FIGS. 2A and 2B as extending parallel to each other in the cable 500 without twisting around each other, it should be appreciated that the first signal conductor 501*a* and the second signal conductor 501*b* may twist around each other along a longitudinal direction of the cable 500 with a certain lay length. In the illustrated embodiment, cable connector 1 terminates 18 cables all configured as cable 500. In some embodiments, one or more of the cables may have a different configuration. Also, it should be appreciated that FIG. 2A shows one end of a cable 500 prepared for termination to a cable connector 1. A second end of the cable may be similarly prepared fort termination or may be terminated in any other way, suitable for making connections to an electronic component within an electronic system.

Referring back to FIGS. 1A and 1C, the terminal retention mechanism 300 is configured for retaining a plurality of conductive terminals 200 in multiple, here two, terminal rows 200*a* and 200*b* mutually opposed and spaced apart. It should be appreciated that the conductive terminals 200 of the cable connector 1 may be arranged in any other numbers of terminal rows, such as a single row or more than two rows.

Figure 3A:
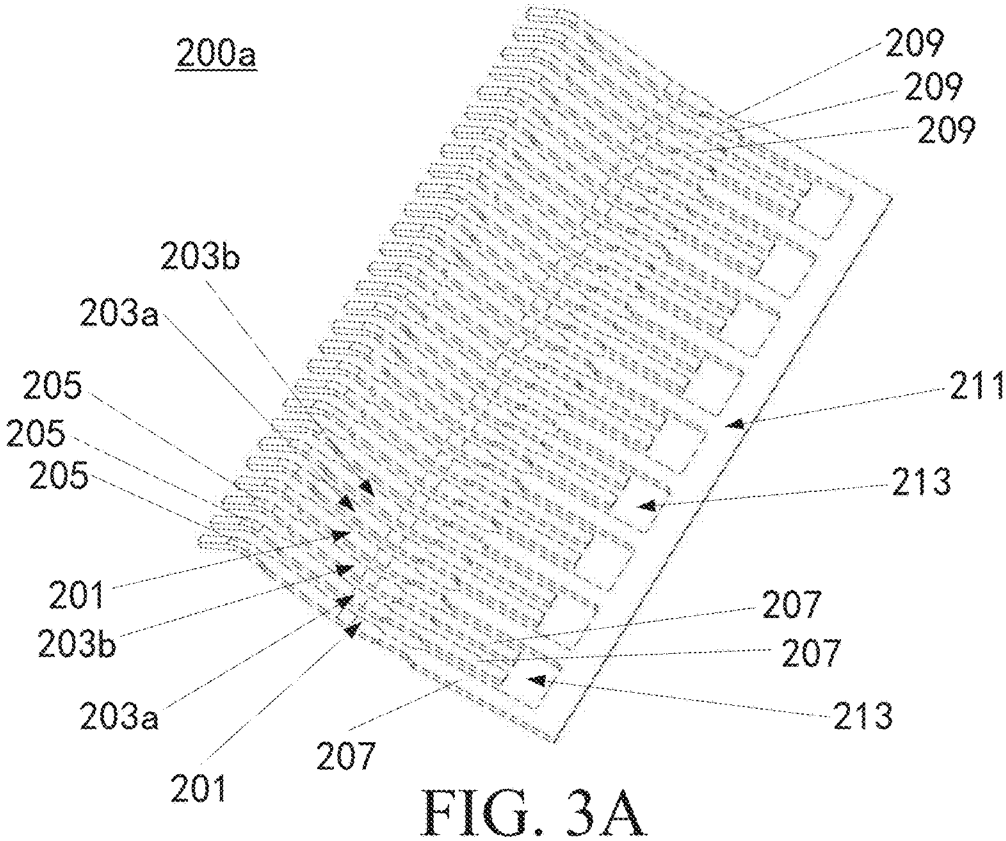
FIG. 3A is a perspective view of a row of conductive terminals of the cable connector of FIG. 1A.
Figure 3B:
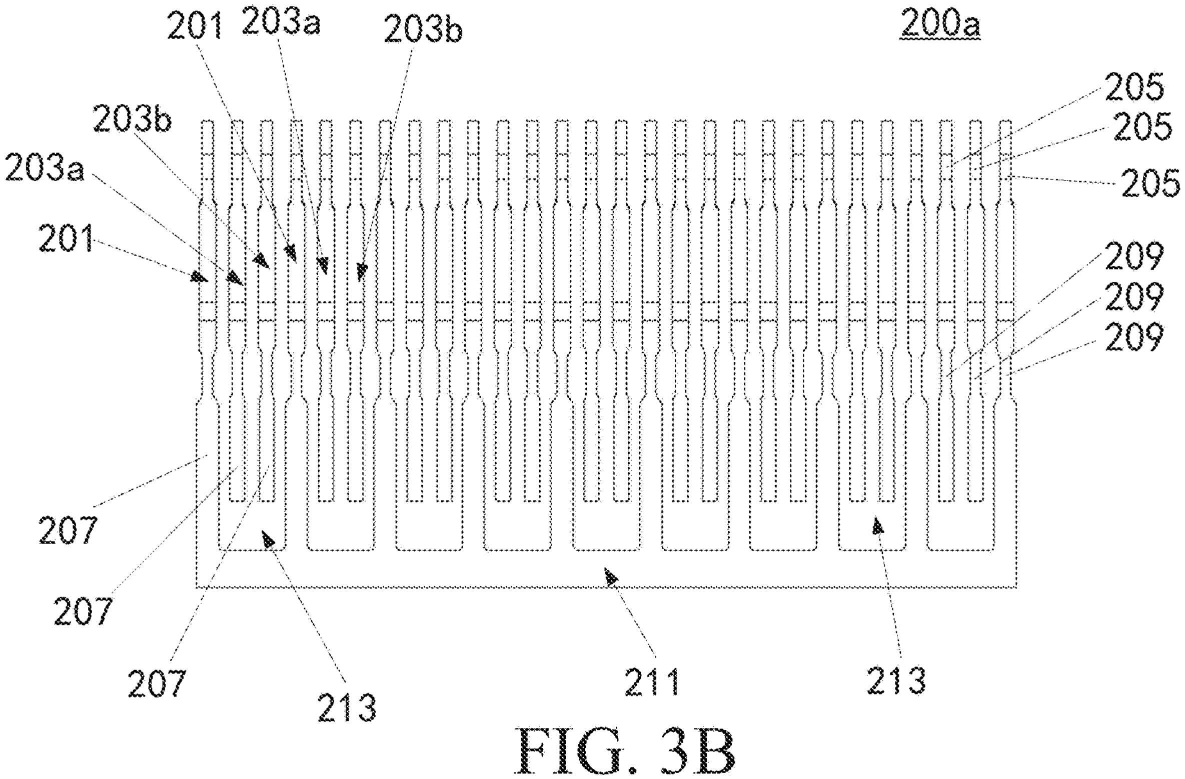
FIG. 3B is a top view of the row of the conductive terminals of FIG. 3A.

FIGS. 3A and 3B schematically illustrate a terminal row 200*a* of the conductive terminals 200 of the cable connector 1. As shown in FIGS. 3A and 3B, the conductive terminals in the terminal row 200*a* are substantially aligned therein and include a plurality of pairs of signal terminals (which may also be referred to as "signal pins") ("S") and a plurality of ground terminals (which may also be referred to as "ground pins") ("G") 201. Each of the signal terminals and the ground terminals 201 is formed of a conductive material. The conductive material suitable for forming the conductive terminals may be a metal (e.g., a copper) or a metal alloy (e.g., a copper alloy).

Each pair of signal terminals of the plurality of pairs of signal terminals includes a first signal terminal 203*a* and a second signal terminal 203*b*. The first signal terminal 203*a* and the second signal terminal 203*b* may have the same configuration. The first signal terminal 203*a* and the second signal terminal 203*b* may form a differential signal pair for transmitting differential signals. For example, the first signal terminal 203*a* may be energized by a first voltage, and the second signal terminal 203*b* may be energized by a second voltage that cooperates with the first voltage. The voltage difference between the first signal terminal 203*a* and the second signal terminal 203*b* represents a signal.

Each of the first signal terminal 203*a*, the second signal terminal 203*b* and the ground terminal 201 includes a contact portion 205, a tail portion 207 and an intermediate portion, here shown as body portion 209, extending between the contact portion 205 and the tail portion 207. The tail portion 207 is configured for electrically connecting with the end portion of the cable 500, and the contact portion 205 is configured for electrically connecting with a conductive portion of a mating component, such as a pad on a circuit board (not shown), which will be described in detail below.

In the illustrated embodiment, the contact portions 205 are shaped as beams. The contact portions 205 curve into socket 103 such that they are deflected upon insertion of a mating component in socket 103 to generate force for making electrical and mechanical contact to pads on the mating component. A pair of signal terminals (i.e., the first signal terminal 203*a* and the second signal terminal 203*b*) is arranged between two adjacent ground terminals 201. In this way, the ground terminals 201 are able to separate two adjacent pairs of signal terminals to reduce crosstalk between the two adjacent pairs of signal terminals, thereby improving signal integrity. These conductive terminals are aligned in the terminal row 200*a* in a "G-S-S . . . G-S-S-G" pattern as shown in FIGS. 3A and 3B, with two adjacent pairs of signal terminals separated by a ground terminal.

The tail portions 207 of the ground terminals 201 extend beyond the tail portions 207 of the first signal terminals 203*a* and the second signal terminals 203*b* and are connected together through the crossbar 211. The tail portions 207 of the ground terminals 201, the tail portions 207 of the first signal terminals 203*a* and the second signal terminals 203*b*, and the crossbar 211 are substantially in the same plane. The tail portions 207 of the first signal terminal 203*a* and the second signal terminal 203*b* are disposed in a U-shaped space 213 defined by the tail portions 207 of two adjacent ground terminals 201 and the crossbar 211. Connecting the tail portions 207 of the ground terminals 201 together through the crossbar 211 may provide a conductive or partially conductive pathway between the ground terminals 201, thereby bridging the ground terminals 201 together. This may control or damp undesired resonances occurring within the ground terminals 201 during operation of the cable connector 1, thereby improving signal integrity. The crossbar 211 may be formed from any suitable material. In some examples, the crossbar 211 may be formed from the same type of material that forms the ground terminals 201 or other suitable conductive material. In some other examples, the crossbar 211 may be formed of an electrically lossy material. For example, the crossbar 211 may be molded from or comprise an electrically lossy material. However, in the illustrated embodiment, crossbar 211 is of the same material and thickness as the ground terminals 201 and is stamped from the same sheet of metal in the same operation as ground terminals 201.

Figure 4:
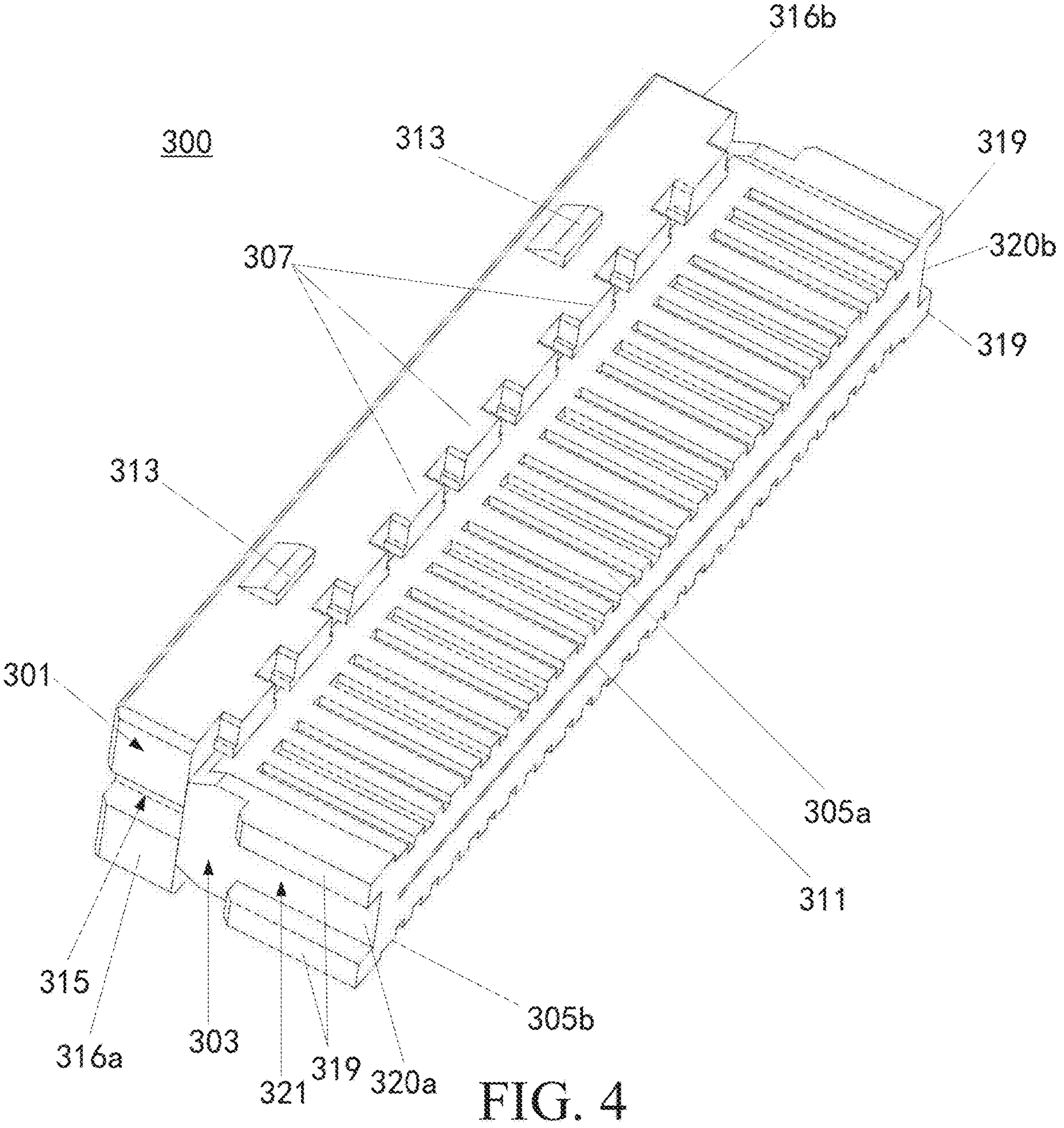
FIG. 4 is a perspective view of a terminal retention mechanism of the cable connector of FIG. 1A.

FIG. 4 schematically illustrates the terminal retention mechanism 300 of the cable connector 1. As shown in FIG. 4, the terminal retention mechanism 300 is an elongated T-shaped body and includes a vertically extending retention portion 301 and a boss portion (which may also be referred to as a "table portion") 303 extending laterally from the retention portion 301. The retention portion 301 is configured for being disposed around the plurality of conductive terminals 200 to retain the plurality of conductive terminals 200 in the two terminal rows 200*a* and 200*b* as described above. The terminal retention mechanism 300 may be formed of an insulative material. Examples of insulative materials that are suitable for forming the terminal retention mechanism 300 include, but are not limited to, plastic, nylon, liquid crystal polymer (LCP), polyphenylene sulfide (PPS), high temperature nylon or polyphenylene oxide (PPO) or polypropylene (PP).

FIG. 4 illustrates the terminal retention mechanism 300 without terminals 200 shown. In some embodiments, terminal retention mechanism 300 may be molded as an insulative body and then terminals 200 may be inserted into openings in the insulative body. In other embodiments, terminal retention mechanism 300 may be formed as one or more insulative members molded around respective groups of terminals 200. One insulative member, for example, may be molded around each row of terminals 200.

Figure 5:
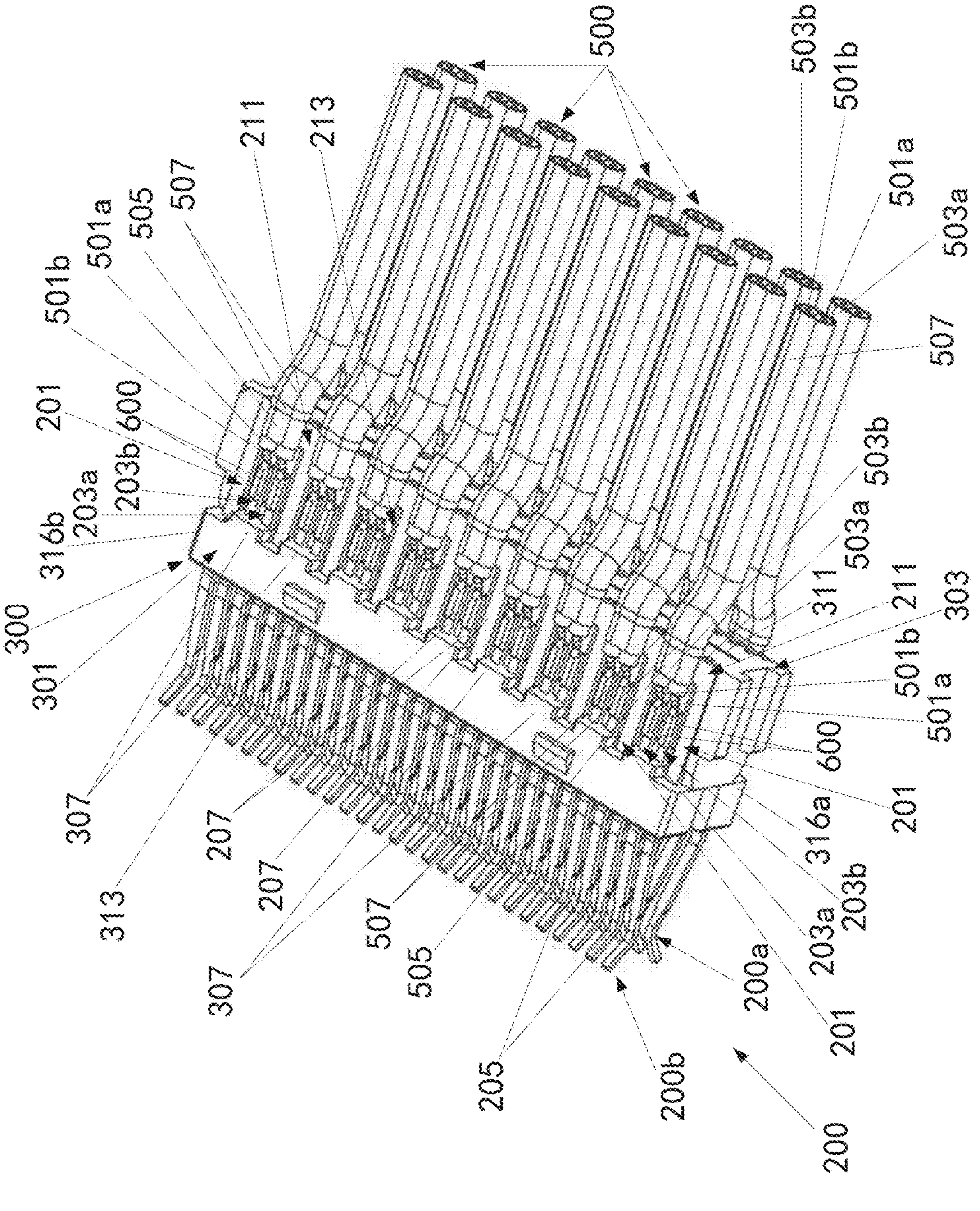
FIG. 5 is a perspective view of the cable connector of FIG. 1A with an insulative housing and a shield mechanism removed.

Regardless of how retention mechanism 300 is integrated with terminals 200, table portion 303 may be shaped such that at least an upper surface of the tail portions 207 of the signal conductors is exposed for termination to conductive structures of cables. FIG. 5 schematically illustrates, in a perspective view, a plurality of the cables shown in FIG. 2A being connected to the conductive terminals of the cable connector shown in FIG. 1A, wherein the insulative housing 100 and the shield mechanism 400 of the cable connector 1 are removed.

As shown in FIG. 5, the body portions 209 (which are obscured in FIG. 5 by the retention portion 301) of the conductive terminals in each of the two terminal rows 200*a* and 200*b* are retained in the retention portion 301, and the tail portions 207 of the conductive terminals protrude from the retention portion 301 and rest on a corresponding one of a first side 305*a* (FIG. 4) and a second side 305*b* (FIG. 4) opposite to the first side 305*a* of the boss portion 303. That is, the boss portion 303 separates the tail portions 207 of the conductive terminals in the two terminal rows 200*a* and 200*b*. Each terminal row is arranged on a corresponding side of the boss portion 303 in such a way that the tail portions 207 of the ground terminals 201, the tail portions 207 of the first signal terminals 203*a* and the second signal terminals 203*b* and the crossbar 211 are substantially in the same plane. The tail portions 207 of the first signal terminal 203*a* and the second signal terminal 203*b* are disposed in a U-shaped space 213 defined by the tail portions 207 of two adjacent ground terminals 201 and the crossbar 211. In some examples, the terminal retention mechanism 300 may be molded directly around the conductive terminals. In some other examples, the retention portion 301 and the boss portion 303 may be formed separately and then assembled together.

With continuing reference to FIG. 5, a plurality of cables 500 (in the figure, eighteen cables) are connected to the plurality of conductive terminals 200 of cable connector 1. In particular, each cable 500 is processed at an end portion in such manner that a pair of signal conductors (i.e., the first signal conductor 501*a* and the second signal conductor 501*b*) extend beyond the shield conductor 505. Each signal conductor of the pair of signal conductors of each cable 500 is connected to the tail portion 207 of a corresponding one pair (i.e., the first signal terminal 203*a* and the second signal terminal 203*b*) of the plurality of pairs of signal terminals, thereby enabling transmission of differential signals between the cable 500 and the cable connector 1. Each signal conductor may be connected to the tail portion 207 of a corresponding signal terminal by soldering. As shown in FIG. 5, solder 600 may be applied to the connection area where the signal conductor is connected to the tail portion 207 of the corresponding signal terminal and form a solder joint, so as to connect the signal conductor to the tail portion 207 of the corresponding signal terminal and establish an electrical connection therebetween. It should be appreciated that any other suitable method, such as welding, may be used to connect the signal conductor to the tail portion of the corresponding signal terminal. The shield conductor 505 is held on and in contact with the crossbar 211, as will be described in detail below in conjunction with FIG. 1A.

Figure 6:
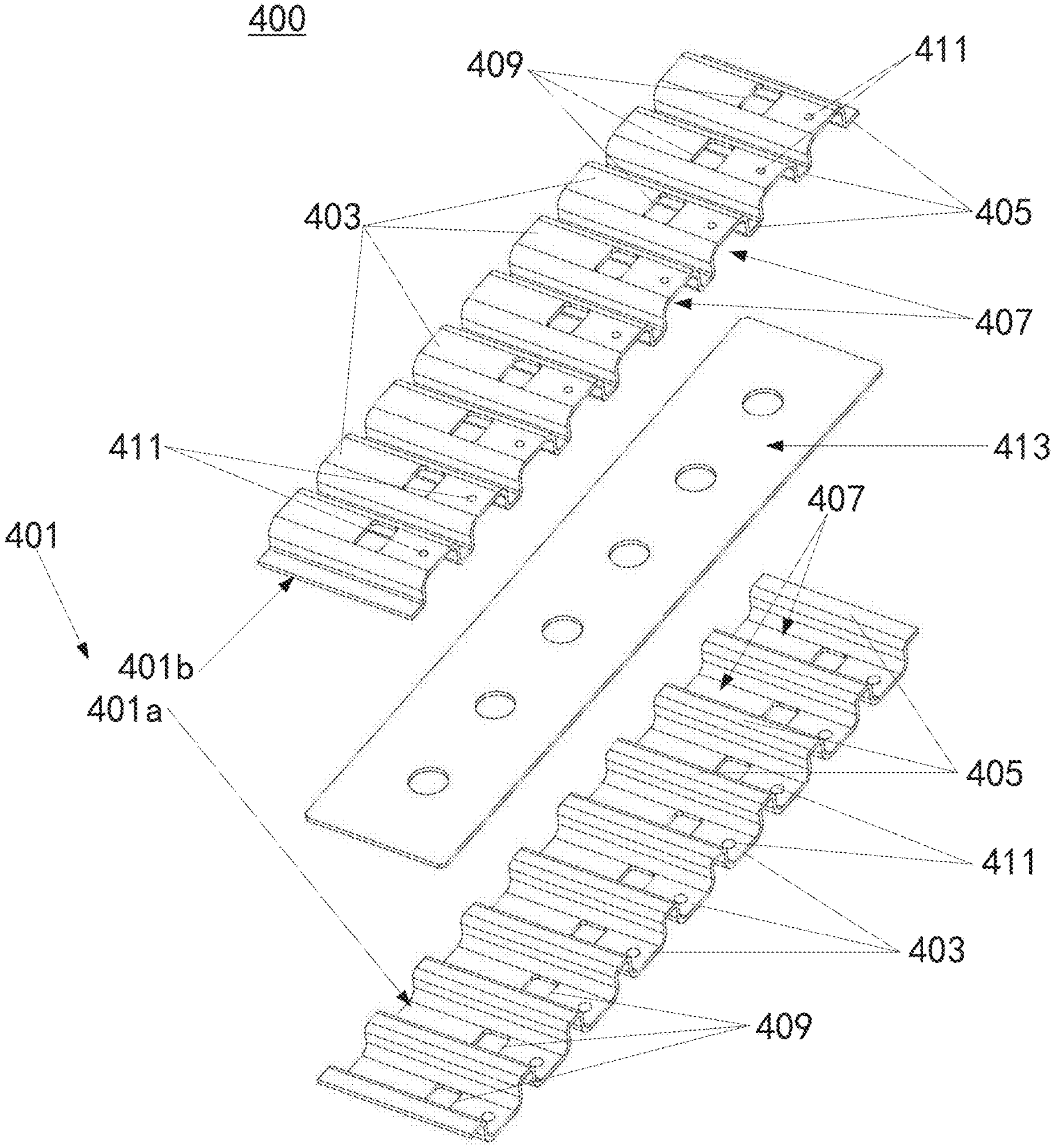
FIG. 6 is a perspective view of a shield mechanism of the cable connector of FIG. 1A.

FIG. 6 schematically illustrates the shield mechanism 400 of the cable connector 1. The shield mechanism 400 includes a first shield member 401 configured for mounting onto and in contact with the ground terminals 201 and/or crossbar 211 (e.g., by laser welding) and across the signal conductors (i.e., the first signal conductor 501*a* and the second signal conductor 501*b*) and the signal terminals (i.e., the first signal terminal 203*a* and the second signal terminal 203*b*), and holding the shield conductors 505 on the crossbar 211 such that the shield conductor 505 is in contact with the crossbar 211. Holding the shield conductor 505 of the cable 500 on the crossbar 211 can prevent the signal conductors from moving relative to the signal terminals, so as to improve the reliability of the connection between the signal conductors and the signal terminals and thus the reliability of the cable connector 1. The first shield member 401 may be formed of any suitable shielding material. As shown, the valley portions 405 may be attached to the ground terminals 201 and the signal conductors of the cable and the portions of the tails of the signal terminals of the connector may fit within the peak portions 403.

As shown in FIG. 6, the first shield member 401 is in the form of a pair of first shield plates 401*a* and 401*b*. Each of the pair of first shield plates 401*a* and 401*b* extends longitudinally at least along the entire length of the corresponding terminal row and laterally at least along the tail portions 207 of the plurality of ground terminals 201 of the corresponding terminal row and the crossbar 211. When the cables 500 are connected to the plurality of conductive terminals 200 of the cable connector 1, the pair of first shield plates 401*a* and 401*b* is mounted (e.g., by laser welding) from outside of the two terminal rows 200*a* and 200*b* onto and in contact with the plurality of ground terminals 201 of the corresponding terminal row, respectively, and press against and are in contact with the shield conductors 505, thereby holding the shield conductors 505 on the crossbar 211 such that the shield conductors 505 are in contact with the crossbar 211. As such, the first shield member 401, the ground terminals 201, the crossbar 211 and the shield conductors 505 together form a shield around the connection area where the signal conductors are connected to the signal terminals, thereby improving the signal integrity of the signal transmission between the cable 500 and the cable connector 1.

As shown in FIG. 6, each of the pair of first shield plates 401*a* and 401*b* is a wave-shaped plate having a peak portion 403 and a valley portion 405. Each valley portion 405 is mounted (e.g., by laser welding) onto and in contact with a corresponding ground terminal 201 of the plurality of ground terminals 201. The first shield plates 401*a* and 401*b* may overlap the crossbar 211 and in some embodiments may be welded to crossbar 211 (not shown in FIG. 6; see, e.g., FIG. 3A). Each peak portion 403 spans the signal conductors and the signal terminals and defines a chamber 407. The end portion of the cable 500 is received in the chamber 407, and the peak portion 403 presses against and is in contact with the shield conductor 505 to hold the shield conductor 505 on the crossbar 211. Each peak portion 403 is formed with an aperture 409 open to the chamber 407 to allow at least a connection area where the signal conductors are connected to the tail portions 207 of the corresponding signal terminals to be accessible via the aperture 409. The aperture 409 allows for checking, via it, the integrity of the connection area where the signal conductors are connected to the tail portions of the corresponding signal terminals, for example checking the integrity of the solder joint. Furthermore, the aperture 409 also allows for checking, via it, whether there is a short circuit between this connection area and the first shield member 401, for example checking whether there is a short circuit between the solder 600 and the first shield member 401. This can improve the reliability of the cable connector 1.

As shown in FIGS. 1A and 6, a first portion of each peak portion 403 in contact with the shield conductor 505 is formed with a first retention mechanism 411 to improve a holding force on the shield conductor 505. In some examples, as shown, the first retention mechanism 411 includes a protrusion protruding into the chamber 407 from the first portion. The protrusion may be an embossment formed by pressing the peak portion 403 toward the chamber 407 from the other side of the peak portion 403. It should be appreciated that the first retention mechanism 411 may be a barb protruding from the first portion into the chamber 407, or in any other suitable form. It should also be appreciated that a second portion of the crossbar 211 in contact with the shield conductor 505 may be formed with a second retention mechanism (not shown) to improve a holding force on the shield conductor 505. Similar to the first retention mechanism 411, the second retention mechanism may be a protrusion or barb protruding from the second portion into the chamber 407, or in any other suitable form.

As shown in FIGS. 4 and 5, the retention portion 301 of the terminal retention mechanism 300 includes a first positioning protrusion 307 protruding onto the first side 305*a* and the second side 305*b* of the boss portion 303. The first positioning protrusion 307 is configured for cooperating with the peak portion 403 to enable the pair of first shield plates 401*a* and 401*b* to be accurately positioned relative to the plurality of ground terminals 201 and preventing the pair of first shield plates 401*a* and 401*b* from moving in a direction along the first side 305*a* and the second side 305*b* relative to the plurality of ground terminals 201 when the pair of first shield plates is mounted onto the plurality of ground terminals 201.

As shown in FIG. 6, the shield mechanism 400 may also include a second shield member 413 configured for being disposed between the two terminal rows 200*a* and 200*b* in the terminal retention mechanism 300. The second shield member 413 may be formed of any suitable shielding material. The second shield member 413 extends longitudinally at least along the entire length of the two terminal rows 200*a* and 200*b* and laterally at least along the tail portions 207 of the plurality of ground terminals 201 and the crossbar 211. The second shield member 413 can electrically isolate the two terminal rows 200*a* and 200*b* and form a shield between the two terminal rows 200*a* and 200*b*. This can reduce crosstalk between high speed signals in the two terminal rows 200*a* and 200*b*, thereby improving a signal integrity. This allows the two terminal rows 200*a* and 200*b* to be arranged at a small interval relative to each other, thereby reducing the overall size of the cable connector 1. The second shield member 413 together with the first shield member 401, the ground terminals 201, the crossbar 211 and the shield conductors 505 form a shield around the connection area where the signal conductors are connected to the tail portions of the corresponding signal terminals, thereby further improving the signal integrity of the signal transmission between the cable 500 and the cable connector 1.

As shown in FIG. 6, the second shield member 413 may be in the form of a perforated shield plate. In some examples, as shown in FIGS. 4 and 5, the boss portion 303 of the terminal retention mechanism 300 may be formed with a slot 311 for receiving the second shield member 413. In some other examples, the terminal retention mechanism 300 may be molded directly around the second shield member 413 to hold the second shield member 413 therein. The second shield member 413 is connected to the crossbar 211 and/or the pair of first shield plates 401*a* and 401*b* (not shown), or is electrically floated by being insulated from the crossbar 211 and the pair of first shield plates 401*a* and 401*b*.

Figure 7A:
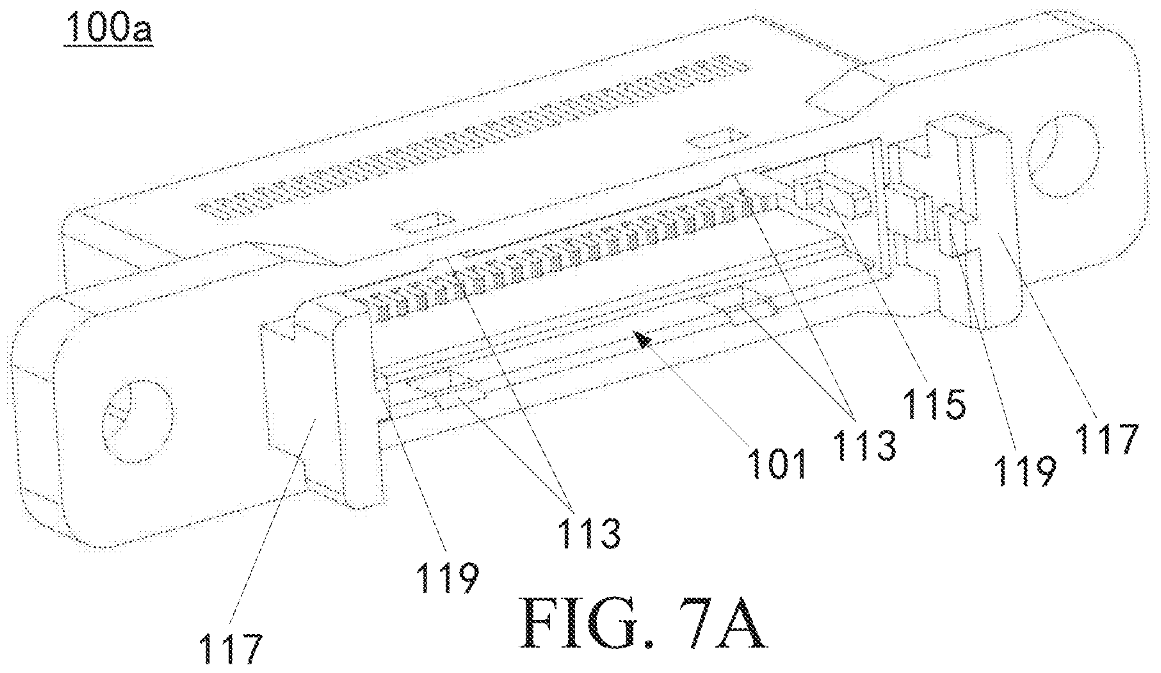
FIG. 7A is a perspective view of a first housing portion of the insulative housing of the cable connector of FIG. 1A.
Figure 7B:
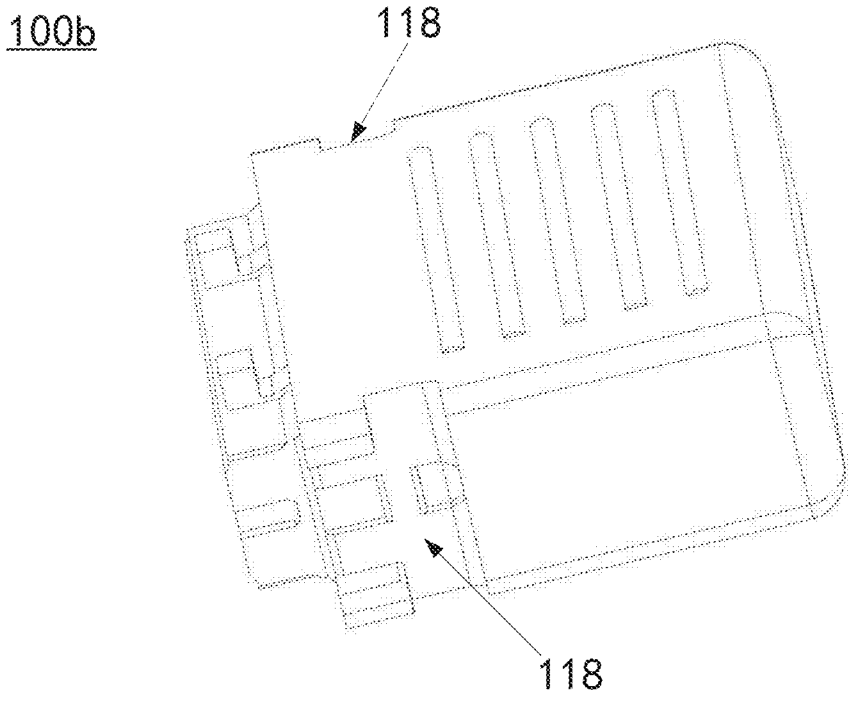
FIG. 7B is a perspective view of a second housing portion of the insulative housing of the cable connector of FIG. 1A.

Referring back to FIGS. 1A to 1D, the insulative housing 100 includes a first housing portion 100*a* and a second housing portion 100*b* configured to be mounted to the first housing portion 100*a*. FIGS. 7A and 7B schematically illustrate the first housing portion 100*a* and the second housing portion 100*b* of the insulative housing 100, respectively. The insulative housing 100 may be formed of an insulative material. Examples of insulative materials that are suitable for forming the insulative housing 100 include, but are not limited to, plastic, nylon, liquid crystal polymer (LCP), polyphenylene sulfide (PPS), high temperature nylon or polyphenylene oxide (PPO) or polypropylene (PP). It should be appreciated that the first housing portion 100*a* and the second housing portion 100*b* may be formed from the same insulative material or from different insulative materials.

As shown in FIG. 7A, the first housing portion 100*a* defines a terminal cavity 101 therein. The retention portion 301 of the terminal retention mechanism 300 is configured to be received in the terminal cavity 101 of the first housing portion 100*a*. The boss portion 303 of the terminal retention mechanism 300 is configured to protrude from the first housing portion 100*a* and to be received in the second housing portion 100*b* when the retention portion 301 is received in the terminal cavity 101.

The second housing portion 100*b* is configured for holding the first shield member 401 (shown as the pair of first shield plates 401*a* and 401*b*) in position when being mounted to the first housing portion 100*a*. This allows the first shield member 401 to be reliably mounted onto the ground terminals 201 and the shield conductors 505. The second housing portion 100*b* may be secured to the first housing portion 100*a* by a dual injection molding. It should be appreciated that the second housing portion 100*b* may also be formed and assembled with the first housing portion 100*a* by other suitable means.

Figure 1C:
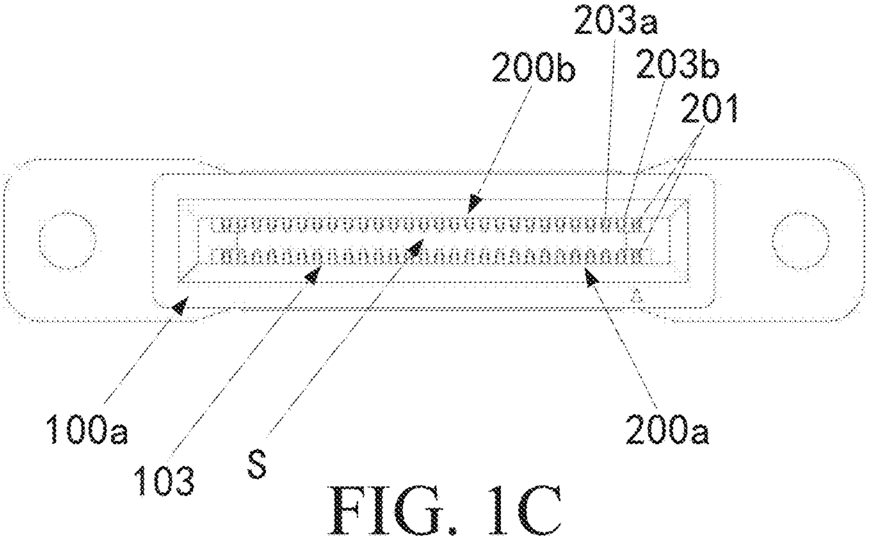
FIG. 1C is a front view of the cable connector of FIG. 1B.
Figure 1D:
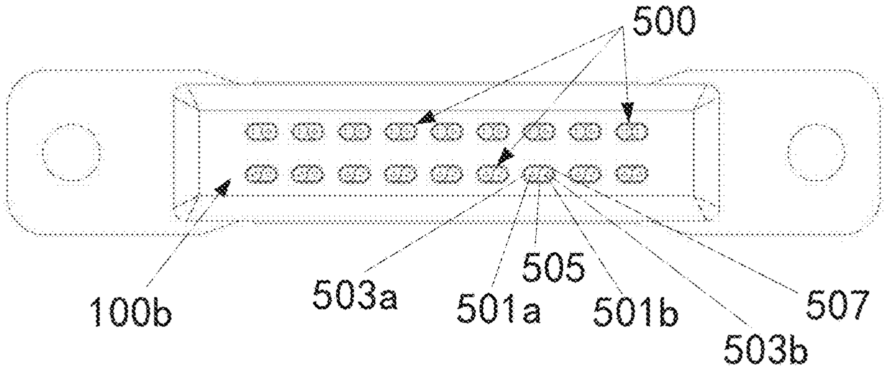
FIG. 1D is a rear view of the cable connector of FIG. 1B.

In some examples, as shown in FIGS. 1A and 1C, when the retention portion 301 is received in the terminal cavity 101, the contact portions 205 of the conductive terminals in each terminal row 200*a* and 200*b* extend cantilevered from the retention portion 301 opposite to the tail portions 207 and into the terminal cavity 101, and together with the contact portions 205 of the conductive terminals in the other terminal row define therebetween a receiving space S for receiving the conductive portion of the circuit board. In this case, a first socket 103 is formed in the first housing portion 100*a* and opens to the terminal cavity 101. The first socket 103 is configured for allowing a portion on or near the edge of the circuit board, such as a daughter card, to be inserted therethrough into the receiving space S, such that the conductive portion of the circuit board is inserted between and in contact with the contact portions 205 of the conductive terminals in the two terminal rows 200*a* and 200*b*. It should be appreciated that the terminals 200 of the cable connector 1 may be arranged in any other numbers of terminal rows. It should also be appreciated that the first housing portion 100*a* may have any other numbers of sockets, such as two or more sockets. Although the two terminal rows 200*a* and 200*b* are illustrated in FIGS. 1A and 1C as being spaced apart in such a way that the conductive terminals are aligned with each other along an arrangement direction, it should be appreciated that the two terminal rows 200*a* and 200*b* may be spaced apart in such a way that the conductive terminals are staggered with each other along the arrangement direction.

It should be appreciated that, in some other examples, the contact portions 205 of the conductive terminals of each terminal row 200*a* and 200*b* may extend cantilevered from the retention portion 301 opposite to the tail portion 207 and to the exterior of the first housing portion 100*a*, and extend opposite to the contact portions 205 of the conductive terminal in the other terminal row outside the first housing portion 100*a*. This allows the contact portions 205 to be mounted (e.g., by surface mounting technique) onto the conductive portion of the circuit board. Although the contact portions 205 are shown as extending substantially parallel to the tail portions 207, it should be appreciated that the contact portions 205 may extend at any suitable angle (e.g., a right angle) relative to the tail portions 207.

The retention portion 301 of the terminal retention mechanism 300 may include a first attachment structure 313, and the first housing portion 100*a* may include a second attachment structure 113. The first attachment structure 313 and the second attachment structure 113 are configured for cooperating with each other to secure the retention portion 301 in the terminal cavity 101. As shown in FIG. 4, the first attachment structure 313 includes a barb protruding from the retention portion 301, and as shown in FIG. 7A, the second attachment structure 113 includes a notch formed in the first housing portion 100*a* for receiving the barb. It should be appreciated that the first attachment structure 313 and the second attachment structure 113 may also be in any other suitable form.

The retention portion 301 of the terminal retention mechanism 300 may include a first positioning structure 315, and the first housing portion 100*a* may include a second positioning structure 115. The first positioning structure 315 and the second positioning structure 115 are configured to cooperate with each other to enable the retention portion 301 to be accurately positioned in the terminal cavity 101 when the retention portion 301 is placed into the terminal cavity 101. As shown in FIG. 4, the first positioning structure 315 includes first positioning slots recessed into the retention portion 301 from two longitudinally opposite end faces 316*a* and 316*b* of the retention portion 301, respectively, and as shown in FIG. 7A, the second positioning structure 115 includes first positioning ribs protruding into the terminal cavity 101 from inner walls of the terminal cavity 101. It should be appreciated that the first positioning structure 315 and the second positioning structure 115 may be in any other suitable form.

The first housing portion 100*a* may include a first mounting structure 117, and the second housing portion 100*b* may include a second mounting structure 118. The first mounting structure 117 and the second mounting structure 118 are configured for cooperating with each other to secure the first housing portion 100*a* and the second housing portion 100*b* together. As shown in FIGS. 1A and 7A to 7B, the first mounting structure 117 includes two T-shaped protrusions mutually opposed formed across the terminal cavity 101 on the first housing portion 100*a*, and the second mounting structure 118 includes two T-shaped recesses recessed into the second housing portion 100*b* from two longitudinally opposite end faces 121*a* and 121*b* of the second housing portion 100*b*. Each of the two T-shaped protrusions snaps into a corresponding one of the two T-shaped recesses. It should be appreciated that the first mounting structure 117 and the second mounting structure 118 may be in any other suitable form.

The boss portion 303 of the terminal retention mechanism 300 may include a third positioning structure 319, and the first housing portion 100*a* may include a fourth positioning structure 119. The third positioning structure 319 and the fourth positioning structure 119 are configured for cooperating with each other to enable the retention portion 301 to be accurately positioned in the terminal cavity 101 when the retention portion 301 is placed into the terminal cavity 101. As shown in FIG. 4, the third positioning structure 319 includes a pair of third positioning ribs protruding from two longitudinally opposite end faces 320*a* and 320*b* of the boss portion 303, respectively. The pair of third positioning ribs defines a second positioning slot 321 therebetween. As shown in FIG. 7A, the fourth positioning structure 119 includes a second positioning rib formed on the two T-shaped protrusions described above. The second positioning rib is received in the second positioning slot 321 between the pair of third positioning ribs. It should be appreciated that the third positioning structure 319 and the fourth positioning structure 119 may also be in any other suitable form.

Although the cable 500 is described above as a component separate from the cable connector 1, it should be appreciated that the cable 500 may be an inherent part of the cable connector 1, and together with the cable connector 1 form an electrical connection system. The cable 500 may be connected to other cables or electronic components at the end portion opposite to the cable connector 1.

The cable connector 1 and the electrical connection system according to the present application can eliminate the need for an intermediate circuit board, thereby saving the costs for manufacturing and assembly of the electronic system, while providing good shielding for the signal transmission, thereby providing good signal transmission performance.

Cable termination designs as disclosed herein, however, may be used in connection with connectors configured to serve other functions. For example, a connector may be constructed with a shielding mechanism at the cable termination as described herein with different shaped contact portions of the terminals 200. The contact portions may be shaped, for example, as blades or pads, for example. The housing for such a connector may have a housing with an insulative tongue with the contact portions exposed in opposing surfaces of the tongues. The tongue may be sized to be inserted into a socket of a mating connector, such as socket 103. In such a configuration, the exposed contact portions of one connector may align with beam-shaped contact portions of the other connector, so as to mate.

It should be noted that the terms "first" and "second" in the description, the claims and the drawings of the application are used to distinguish similar objects, and are not necessarily used to describe a specific sequence. It should be understood that numbers used in this way can be interchanged under appropriate circumstances such that the embodiments of the present disclosure described herein can be implemented in a sequence other than those illustrated or described herein. The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A cable connector comprising:

an insulative housing;

a plurality of conductive terminals held by the insulative housing in a row, each conductive terminal comprising a contact portion extending beyond the insulative housing, a tail portion extending out of the insulative housing, and an intermediate portion at least partially embedded in the insulative housing;

a bar joining the tail portions of a subset of the plurality of conductive terminals; and a shield plate separated from the plurality of conductive terminals by the insulative housing.

2. The cable connector of claim 1, wherein:

the shield plate comprises a plurality of openings.

3. The cable connector of claim 1, wherein:

the shield plate is electrically insulated from the bar.

4. The cable connector of claim 1, wherein:

the insulative housing comprises a socket; and the contact portions of the plurality of conductive terminals curve into the socket of the insulative housing.

5. The cable connector of claim 1, wherein:

the insulative housing comprises a retention portion disposed around the plurality of conductive terminals to retain the plurality of conductive terminals in the row, and a boss portion comprising a plurality of projections; and the tail portions of the plurality of conductive terminals are disposed on the plurality of projections of the boss portion of the insulative housing.

6. The cable connector of claim 1, comprising:

a wave-shaped shield member comprising alternating peak portions and valley portions, wherein each valley portion is mounted to a respective conductive terminal.

7. The cable connector of claim 6, wherein:

each peak portion of the wave-shaped shield member spans a respective pair of conductive terminals of the plurality of conductive terminals.

8. The cable connector of claim 7, wherein:

each peak portion of the wave-shaped shield member comprises an opening sized and positioned to expose at least a portion of the tail portion of the respective pair of conductive terminals of the plurality of conductive terminals.

9. A cable assembly comprising:

an insulative housing;

a plurality of signal terminals held by the insulative housing in a row, each signal terminal comprising a contact portion extending beyond the insulative housing, and a tail portion extending out of the insulative housing;

a ground member comprising a bar disposed adjacent the tail portions of the plurality of signal terminals, and a plurality of ground terminals extending from the bar and between respective ones of the plurality of signal terminals;

a plurality of cables, each cable comprising a signal conductor and a shield conductor surrounding the signal conductor, the shield conductor disposed on a solid portion of a surface of the bar of the ground member, the signal conductor comprising an end extending out of the shield conductor and mounted on the tail portion of a respective one of the plurality of signal terminals;

a wave-shaped shield member comprising alternating peak portions and valley portions, each valley portion mounted to a respective ground terminal, each peak portion abutting the shield conductor of a respective cable of the plurality of cables; and a shield member, wherein the shield member and the plurality of cables are disposed on opposite sides of the ground member.

10. The cable assembly of claim 9, wherein:

the wave-shaped shield member extends beyond the shield conductor of the respective cable of the plurality of cables toward the contact portions of the plurality of signal terminals.

11. The cable assembly of claim 9, wherein:

each peak portion of the wave-shaped shield member comprises an opening aligned with the end of the signal conductor of a respective cable of the plurality of cables.

12. The cable assembly of claim 11, wherein:

each peak portion of the wave-shaped shield member comprises a protrusion or barb protruding toward the shield conductor of the respective cable of the plurality of cables.

13. The cable assembly of claim 9, wherein:

the bar of the ground member comprises a protrusion or barb protruding toward the shield conductor of a respective cable of the plurality of cables.

14. The cable assembly of claim 9, wherein:

the shield member is electrically insulated from the ground member.

15. A cable assembly comprising:

an insulative housing;

a plurality of conductive terminals held by the insulative housing in a row, each conductive terminal comprising a contact portion extending beyond the insulative housing, a tail portion extending out of the insulative housing, and an intermediate portion at least partially embedded in the insulative housing;

a bar joining the tail portions of a portion of the plurality of conductive terminals;

a plurality of cables disposed on a first side of the bar, each cable comprising a signal conductor having an end mounted on the tail portion of a respective one of the plurality of conductive terminals, and a shield conductor surrounding the signal conductor and contacting the bar; and a shield member disposed on a second side of the bar opposite to the first side of the bar.

16. The cable assembly of claim 15, wherein:

the plurality of conductive terminals comprise a plurality of pairs of signal terminals and a plurality of ground terminals disposed between respective pairs of the plurality of pairs of signal terminals; and the bar joins the tail portions of the plurality of ground terminals.

17. The cable assembly of claim 16, further comprising:

a wave-shaped shield member comprising alternating peak portions and valley portions, wherein:

each valley portion is mounted to the tail portion of a respective ground terminal of the plurality of ground terminals; and each peak portion spans a respective pair of the plurality of pairs of signal terminals.

18. The cable assembly of claim 17, wherein:

the shield member comprises a plurality of first openings.

19. The cable assembly of claim 18, wherein:

the wave-shaped shield member comprises a plurality of second openings extending through respective valley portions.

* * * * *